March 1, 1927.  H. E. BLECKER  1,619,560
FISH CATCHING APPARATUS
Filed Aug. 21, 1925  3 Sheets-Sheet 1
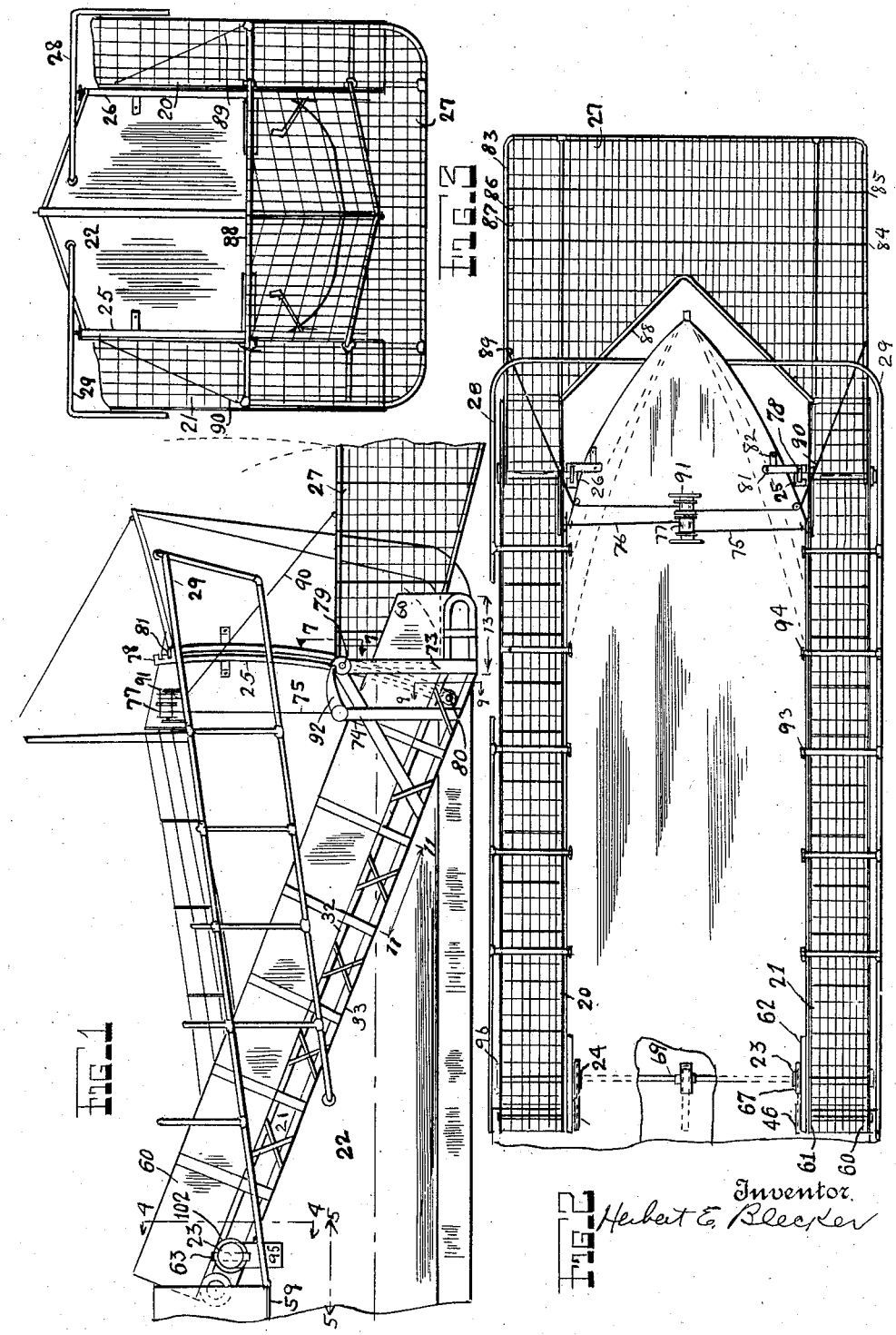
Inventor
Herbert E. Blecker

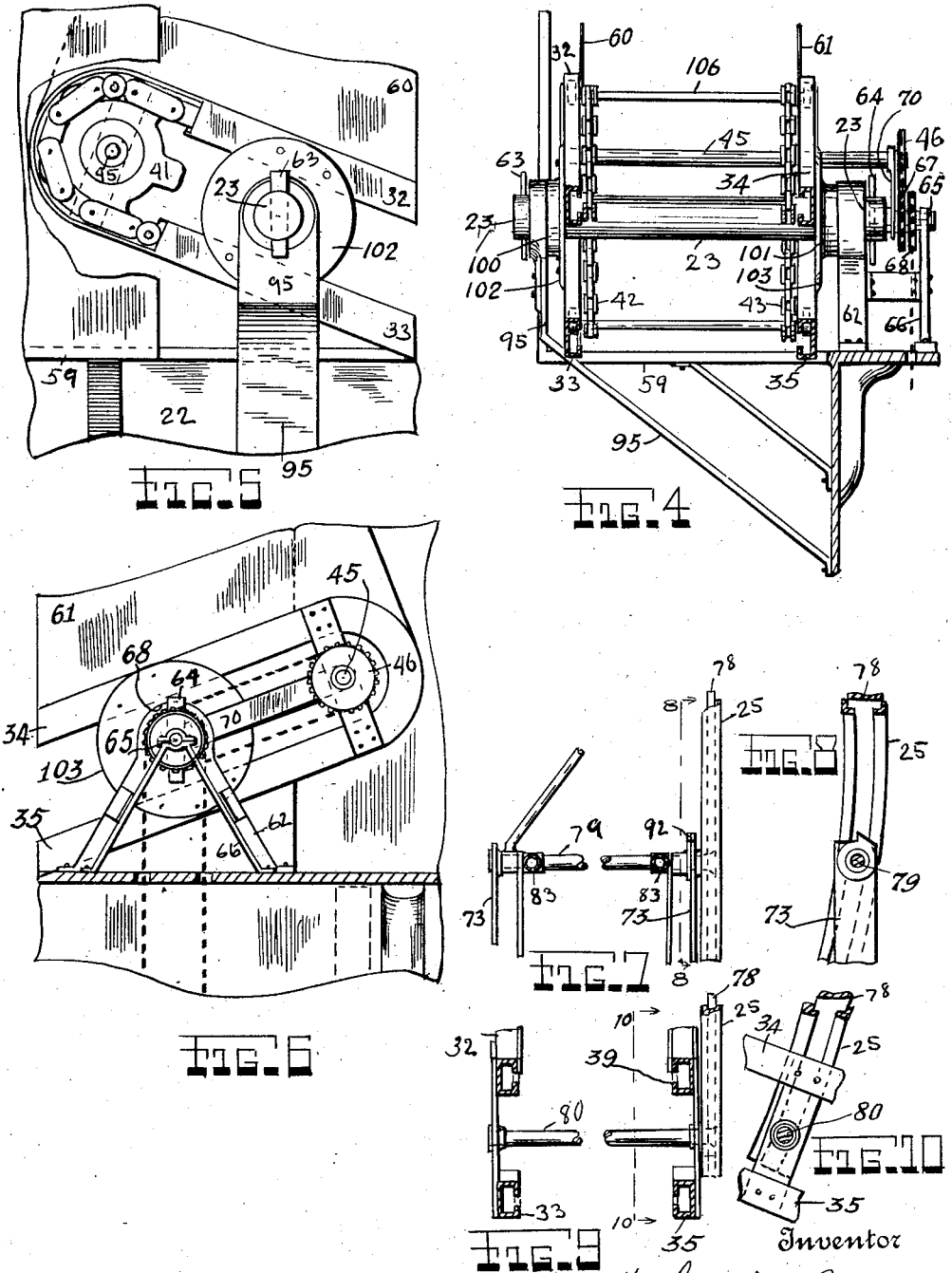

March 1, 1927.  
H. E. BLECKER  
FISH CATCHING APPARATUS  
Filed Aug. 21, 1925  
1,619,560  
3 Sheets-Sheet 3
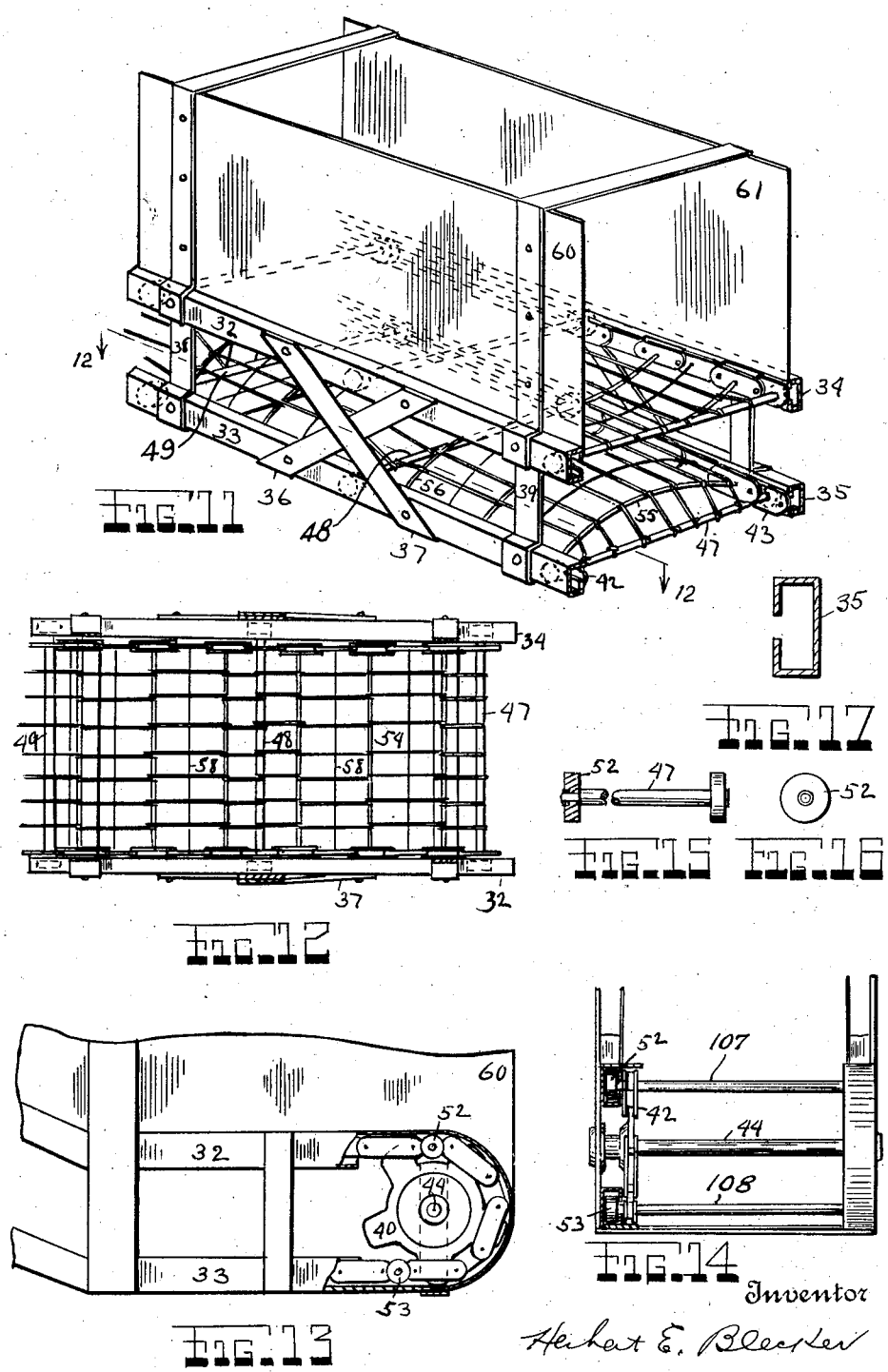

Patented Mar. 1, 1927.

1,619,560

UNITED STATES PATENT OFFICE.

HERBERT E. BLECKER, OF NEW YORK, N. Y.

FISH-CATCHING APPARATUS.

Application filed August 21, 1925. Serial No. 51,676.

This invention relates to improvements in fish catching apparatus and to the mechanical construction of same, and the chief object thereof is to provide a mechanism which shall be capable of operation with a minimum application of power and at the same time to offer the least possible resistance when passing through the water.

A further object is to provide means for lifting the elevator apparatus from the water and maintaining it in an uplifted position when desired, and further means to adjust the angular relation of the receiving net to the said elevator apparatus.

These and other objects will be more definitely explained in the following specification and illustrated in the accompanying drawings.

The invention herein disclosed is an improvement on the device shown in the patent for "fishing apparatus" issued to me; H. E. Blecker, April 8, 1924, No. 1,489,917 and differs from same in the following respects; the side elevators as shown in this application being movably mounted on trunnion bearings, and with means to raise, or lower the conveying apparatus, and with further means for changing the angular relation of the receiving net to the said conveying apparatus.

The construction of the conveying elements as shown in this application is also a marked departure from that of the old.

The protective side guards present a new element in the apparatus as claimed.

In the drawings herewith submitted;

Fig. 1 shows a side view of the apparatus attached to the forward parts of a ship.

Fig. 2 shows a plan, or deck view thereof.

Fig. 3 shows a front, or bow view.

Fig. 4 shows an enlarged section on the line 4—4 of Figure 1.

Fig. 5 shows a side view within the limits indicated at 5—5 in Figure 1.

Fig. 6 shows a reversed view of Figure 5.

Fig. 7 shows an enlarged detail view on the line 7—7 of Figure 1.

Fig. 8 shows a view on the line 8—8 of Figure 7.

Fig. 9 shows an enlarged detail section on the line 9—9 of Figure 1.

Fig. 10 shows a view of the detail on the line 10—10 of Figure 9.

Fig. 11 shows an enlarged detail view within the limits of the line 11—11 of Figure 1.

Fig. 12 shows a plan section on the line 12—12 of Figure 11.

Fig. 13 shows an enlarged detail view within the limits of the line 13 of Figure 1, the mesh being eliminated.

Fig. 14 shows an end view of the parts shown in Figure 13, one side being cut away to disclose the sprocket and chain; the mesh being eliminated in this view.

Fig. 15 shows a pair of rollers mounted on a connecting rod.

Fig. 16 shows a side view of a roller.

Fig. 17 shows an enlarged section of a hollow side rail.

This apparatus comprises the following main elements:

Inclined elevators 20 and 21 are secured to the hull of a vessel 22 by means of the trunnion bearings 23 and 24 and the supporting structure thereof, and secured at their forward ends to the curved supporting members 25 and 26.

A receiving net 27 is hingedly secured at its rear extremities to the elevators 20 and 21, and side protecting guards 28 and 29 are attached to the hull of the vessel.

The detailed construction of the elevator 20 is as follows, the elevator 21 being similar thereto:

Upper and lower hollow rails 32 and 33 with corresponding rails 34 and 35 extend from end to end of the structure, being reinforced by the truss members as shown at 36 and 37 and the side bars as shown at 38 and 39. Pairs of sprocket wheels as shown at 40 and 41 are located at each end of the elevator and engage the links of the chains 42 and 43; the said sprocket wheels being connected by the shafts 44 and 45, the shaft 45 being the driving member and having on its inner end the small sprocket wheel 46. Connecting rods as shown at 47—48—49 and 105, 106, 107 and 108; extend across the breadth of the elevator and are provided with rollers as shown at 52 and 53 which are adapted to travel within the hollow rails as shown and provide support for the net mesh as shown at 54. This mesh is secured to the connecting rods as shown at 47 and 48 and is further supported by curved spreader bars as shown at 55—56, etc. and other intervening rods of lighter construction as shown at 57 and 58. The spreader bars are connected to the links of the chains 42 and 43, and being curved in form cause the mesh to sag, or belly between the connecting rods as shown at 47 and 48 which are straight in form. The longitudinal strands, which with the cross members form the mesh, are preferably of fibrous material as cordage, or the like, and will when passing around the terminals of the elevators hang loosely as the rod members are brought near together on the curves. It will be observed that the longitudinal strands are wrapped about the cross members, passing around and over them to the next juncture, allowance being made for shrinkage or expansion under varying conditions.

It will be further observed that the chains, with the mesh form an endless conveying mechanism, beltlike in action, but allowing for the free passage of water therethrough, and adapted to carry the fish from the receiving net to the elevator decks as shown at 59 in the drawings.

Side walls 60 and 61 prevent the fish from falling from the side of the conveyor.

The trunnion shafts 23 and 24 are supported by A frames as shown at 62 and braces as shown at 95 and 96, being secured in position by the cotter pins as shown at 63 and 64. Bearing members having bosses 100 and 101 and flanges 102 and 103, are rotatably mounted on the shaft 23, and support the elevator frames to which they are secured.

Mounted in the ends of the said trunnion shafts and extending outward therefrom are small auxiliary shaft members as shown at 65 which rest on the light A frames as shown at 66. Mounted on the said shafts as shown at 65 are the drive sprocket wheels as shown at 67 which are connected by chains to the sprocket wheels as shown at 46; and also secured to the said shafts as shown at 65 are sprocket wheels as shown at 68 which are chain connected to the main drive shaft 69. A link member 70 serves to resist the thrust between the sprockets 46 and 67.

Supporting frame members as shown at 73 and 74 are secured to the elevator structure near to its lower extremity. These members are in pairs; one on each side of the structure. Cables as that shown at 75 extend from the members as seen at 74 to a drum, or windlass 77 on the deck of the vessel. By means of these cables the conveyors may be raised, or lowered at will.

The elevator structure at its lower end is secured to the arc bar 78 within the supporting member as shown at 25 by means of the cross shafts 79 and 80. The said arc bar 78 is slotted at intervals near its upper extremity and may be locked in any desired position by the latch 81 which is further secured by the stop bar 82.

The receiving net 27 is constructed with a frame 83, preferably of piping which is pivotally secured to the cross shafts as shown at 79. From these points of connection the piping extends downward along the inner sides of the elevator walls and at points immediately above the conveying chains it further extends forward to the end of the conveyor and thence inclines downward to its forward extremity. The mesh, of which the horizontal strands are preferably of cordage, or the like, is wound around and over each transverse rod as those shown at 84—85, etc., and over and under the lighter transverse wires as shown at 86 and 87.

A bow shield 88 with similar mesh serves to guide the incoming fish to the elevators at the sides of the vessel. The said receiving net structure is connected by the cables 89 and 90 to the forward drum, or windlass 91, and may be raised or lowered independently of the elevators. When fully lowered it is locked in position by the pawls as shown at 92.

The side guards 28 and 29 are designed to protect the elevator structure when the vessel is alongside of a dock or the like. They are constructed preferably of piping and secured at the forward ends to the hull of the vessel and further secured at intervals along the sides by the cross hangers as shown at 93—94, etc.

Having thus described my invention, I claim as new and desire to secure by Letters Patent, the following:

1. In an apparatus of the class described, the combination with a suitable vessel, of side elevators attached thereto and having hollow side rails in alignment with sprocket wheels, endless chains in mesh with the said sprocket wheels, cross connecting rods attached at intervals to the said chains and having roller members adapted to run within the said hollow rails, spreader bars secured at intervals to the said chains, and cordage secured to the said connecting rods and spreader bars forming therewith a mesh construction, a receiving net secured to the said side elevators and means to actuate the conveying members therewith connected.

2. In an apparatus of the class described, the combination with a suitable vessel of pivotally secured inclined elevators having at the sides thereof hollow rails, supported by the structure of the said elevators, the said hollow rails extending from end to end of the said structure and serving as means to support and to guide cross rods having rollers on the ends thereof and running within the said hollow rails, side chains connecting the said cross rods and running over sprockets at the extremities of the said elevators, and a continuous conveying net secured to the said cross rods, and a receiving net attached to the lower ends of the said elevators and means to raise, or lower the said elevators, and means to actuate the driving mechanism thereof.

3. In an apparatus of the class described, the combination with a suitable vessel, of side elevators mounted at their rear extremities on trunnion bearings and slidably secured at the forward ends to curved supporting members by means of cross shafts attached to arc bars within the said supporting members, continuous chains supporting suitable conveying nets, in mesh with sprocket wheels located at the extremities of the said elevators, the said chains secured at intervals to cross connecting rods with rollers thereon adapted to run within hollow side rails of the said elevators, a receiving net pivotally secured to the said side elevators and adapted to discharge fish, or the like into sagging portions of the conveying nets, means to actuate the said conveying nets through the sprocket members, and means to raise, or lower the side elevators, and other means to raise, or lower the forward portion of the receiving net with relation to its pivotal bearing, substantially as shown and described.

4. In an apparatus of the class described, the combination with a suitable vessel, of side elevator mechanism comprising the following elements, trussed side members having upper and lower side rails of hollow form, sprocket wheels in line with the said side rails and in mesh with continuous side chains, the said side chains supported at intervals by straight connecting rods having rollers attached, which rollers are located within the said hollow rails, spreader rods attached at intervals to the said chains, which rods are of curved formation, strands of cordage, or the like secured to the aforesaid connecting rods and to the curved spreader rods and forming therewith sagging portions between the said connecting rods, the said portions adapted to receive fish, or the like.

5. In an apparatus of the class described, the combination with a suitable vessel having side elevator mechanism with receiving net attached, of trunnion bearings for the elevator of the following construction, shaft members passing through the said elevator frames and supporting same by means of suitable flange members, and themselves supported on the one side by A frames and on the other by angular bracing, substantially as shown and described.

6. In an apparatus of the class described, the combination with a suitable vessel having side elevator mechanism with receiving net attached, of the following driving mechanism, side sprocket wheels mounted on a connecting shaft, which shaft extends beyond the side frame of the elevator mechanism and has keyed thereto another sprocket wheel which is chain connected to a fourth sprocket wheel, which is mounted on an auxiliary shaft concentric with the trunnion shaft of the elevator and is actuated by a fifth sprocket wheel mounted thereon and chain connected to a main driving member, substantially as shown and described.

7. In an apparatus of the class described, the combination with a suitable vesssel having side elevator mechanism with net conveyors mounted therein and receiving net thereto attached, of extended forward portions on the said side elevators of such length as to carry in horizontal position one full subdivision, or sagging portion of the said net conveyor, the receiving net being so connected as to completely cover these extended portions, to the end that no subdivision of the said net conveyor shall at any time be in a position leaving open passage for the escape of fish therefrom.

8. In an apparatus of the class described, the combination with a suitable vessel having side elevators with fish conveying means therein and receiving net attached, of curved and slotted supporting members having therein arc bars to which are attached cross shaft members of the said elevators, and slotted upper portions on the said arc bars adapted to receive latch members and to be locked in position thereby.

9. In an apparatus of the class described, the combination with a suitable vessel having side elevators with net conveyors mounted therein, of a receiving net constructed as follows, a broad forward portion having bottom and side mesh walls supported on suitable frame members which extend backward at the top to cross shaft members of the said side elevators and pivotally attached thereto, and extending downward from these points of attachment along the inner side walls of the said elevators to points in proximity to the said net conveyors and from thence forward to rejoin the frame members of the said receiving net, forward disposed converging net walls extending from the rear of the net proper to points in advance of the bow of the vessel, and means to lock the net frame in position at the points of connection to the said elevators, substantially as shown and described.

10. In an apparatus of the class described, the combination with a suitable vessel having side elevators with fish conveying means therein and receiving net attached, of protective side guards extending along the sides of the vessel outside the line of the said elevators, and supported by means of cross hangers attached to the structure of the said vessel, substantially as shown and described herewith.

11. In an apparatus of the class described, the combination with a suitable vessel, of side elevators pivotally secured at their rear extremities to the hull of the said vessel, a receiving net secured to the said elevators at their forward ends, and means to raise, or lower the said elevators together with the attached receiving net.

12. In an apparatus of the class described, the combination with a suitable vessel, of side conveying mechanism pivotally secured at the rear extremities thereof to the hull of the said vessel, a receiving net attached to the said conveying mechanism, means to raise, or lower the above described apparatus and other means to lock same in any desired position.

Signed at New York city, in the county of New York and State of New York, this 5th day of August A. D. 1925.

HERBERT E. BLECKER.